Oct. 12, 1965     H. W. RASMUSSEN     3,211,381
DEVICE FOR MARKING CHEMICALLY TREATED SURFACES
Filed Aug. 19, 1963
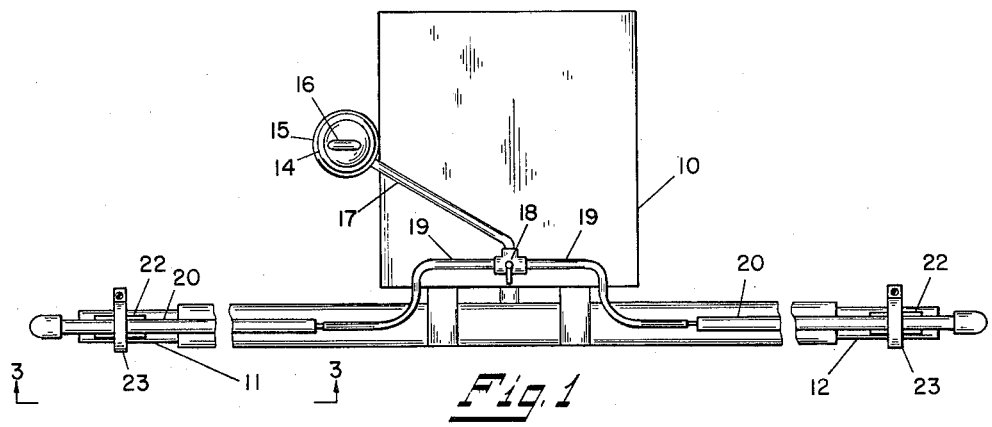
Fig. 1
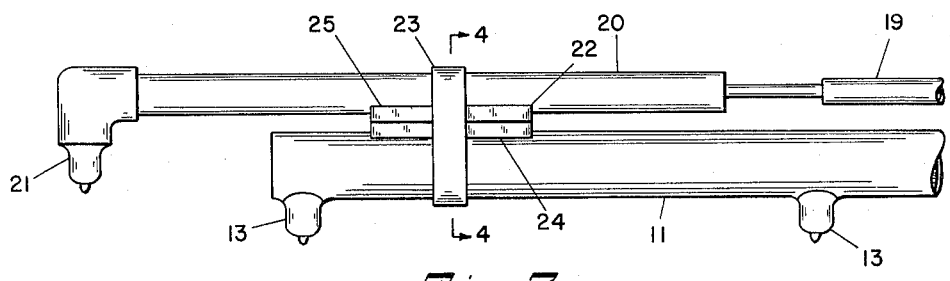
Fig. 3
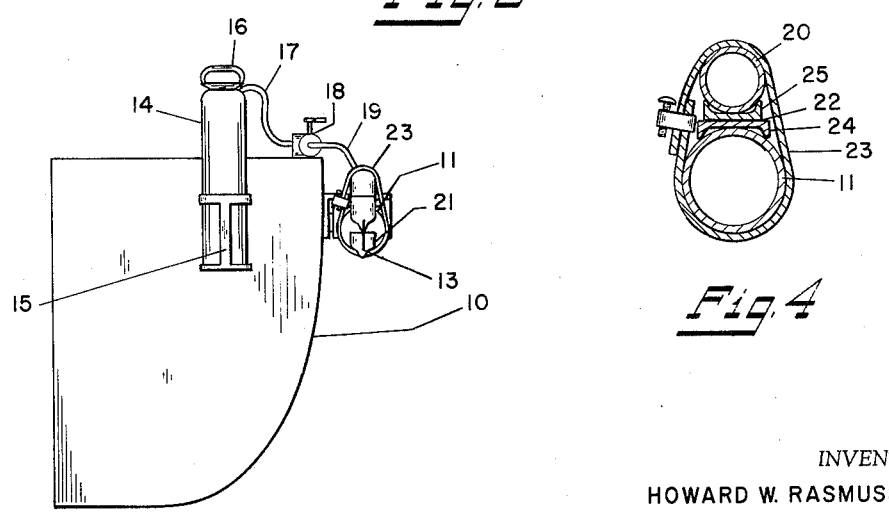
Fig. 2
Fig. 4
INVENTOR.
HOWARD W. RASMUSSEN

United States Patent Office 3,211,381
Patented Oct. 12, 1965

3,211,381
DEVICE FOR MARKING CHEMICALLY TREATED SURFACES
Howard W. Rasmussen, Tomah, Wis., assignor to Contree Sales, Tomah, Wis., a partnership
Filed Aug. 19, 1963, Ser. No. 303,095
2 Claims. (Cl. 239—159)

My invention relates to an improved method for marking a chemically treated surface and to an improved marker for use with a sprayer, spreader or applicator.

Today pesticides, fertilizers, fungicides, weed control chemicals, and other materials control weeds, plant diseases, insects, and facilitate plant growth. Typically, in large scale operations, the material is applied to the plants or other surfaces to be covered in the form of a fine spray discharged by a plurality of nozzles located at spaced intervals on a long boom carried by a truck or tractor, or discharged by a cluster of nozzles or spinners over a given area.

A serious problem is inherent in the use of such booms. Because such materials are normally applied in small amounts which are difficult to detect at a distance, the operator of a boom sprayer is often unable to distinguish the areas which have been covered with material from those areas which have not. Thus he may easily treat some strips of ground twice, while in other places he may leave some strips untouched by the chemical.

Severe economic damage may result in either case. Because of the potency of many chemicals, crops in strips receiving a double application of such materials may be stunted and inferior. Crops in strips which have been missed may be inferior or fail to reach maturity because of weed and insect invasions, or because of lack of necessary plant food.

What is urgently needed is a method and a device which will insure uniform once-over treatment or coverage. My invention provides such a method and device.

A primary object of my invention is to provide a marker which makes possible the uniform application of chemical materials with material applicators such as sprayers and spreaders.

A further object of my invention is to provide such a marker which may be economically used and which is under the continuous control of the operator.

Another important object of my invention is to provide a method of marking a chemically treated surface to facilitate the uniform application of chemicals to a surface without missing some portions of the surface and without twice treating other portions of the surface.

Other objects and advantages of my invention will be apparent from the following detailed description taken in conjunction with the accompanying drawings wherein a preferred embodiment of the principles of the invention has been selected for exemplification.

In the drawings:

FIG. 1 is a top view of a boom sprayer employing my inventive marker.

FIG. 2 is a side view of the sprayer of FIG. 1.

FIG. 3 is a partial rear elevation view of the end of one of the booms of the boom sprayer taken at line 3—3 of FIG. 1.

FIG. 4 is a section view taken along section line 4—4 in FIG. 3.

The sprayer 10 in FIGS. 1 and 2 carries twin booms 11 and 12 which are identical in structure. The sprayer 10 is intended to schematically represent any conventional boom sprayer, whether self-propelled or mounted on tractor, truck or trailer. A plurality of downwardly projecting nozzles 13 adapted to discharge the various spray materials to be applied are located along each of the booms 11 and 12 of the sprayer 10 at spaced intervals, as shown in FIGS. 2 and 3. No other details of the sprayer 10 need be mentioned to describe the operation of my inventive marker.

The fundamental function of my marker is to discharge a small amount of harmless, brightly colored dye upon the surface which is treated to indicate the extent of the treated surface area. The mark of the colored dye on the ground or foliage being sprayed enables the operator to see the extent of land which he has previously sprayed. He thus sprays each strip of land once and only once. The dye may be discharged continuously or intermittently as the operator desires. Use of my device enables the operator to mark only the outermost extent of the treated surface area to indicate the extent of treatment.

The source of the dye is a pressure tank 14 which is preferably contained in a basket-like bracket 15 attached by any suitable means to the sprayer 10, as shown in FIGS. 1 and 2. A pump, the handle 16 of which is seen in FIGS. 1 and 2, projects into the tank 10 for the purpose of putting the contents thereof under pressure.

A hose 17 extends from the tank 14 to a valve 18 which is located to be within handy reach of the operator of the sprayer 10. Two lines of flexible, preferably plastic tubing 19 extend from valve 18, one to go to each of the booms 11 and 12. At its particular boom the tubing 19 joins a preferably rigid conduit 20 extending along each boom. Each conduit 20 extends slightly beyond the outer end of its respective boom, where it terminates in a downwardly projecting nozzle 21. The dye is discharged onto the ground through the nozzles 21.

The valve 18 is preferably a three-way valve. With it the operator can stop the flow of dye or direct it to either or both of the two nozzles 21. He can also control the valve 18 to make the flow of dye intermittent or continuous.

A preferred means for attaching the conduits 20 to the booms 11 and 12 includes a bracket 22 and an adjustable strap 23 best shown in FIG. 4. Essentiallly, the bracket 22 comprises two substantially U-shaped channel members 24 and 25 which are welded or soldered together back to back. The bottom section 24 is of sufficient size to fit snugly over the usually cylindrical outer end of the boom 11 or 12. The top section 25 is of sufficient size to snugly seat the conduit 20. To attach the conduit 20 to one of the booms 11 or 12, the workman positions the bracket 22 on the boom, sets the conduit 22 in the bracket, and finally secures the strap 23 in secure engagement around them all. If desired, two semicircular sections of pipe may replace the substantially U-shaped channel members 24 and 25 to form the bracket 22.

One of the many advantages of my novel marker device is the ease and speed with which it may be mounted on any conventional boom sprayer. Initially the bracket 15 or other suitable mounting means is mounted on the the sprayer 10.

Once the bracket 15 is attached to the sprayer 10, only a few simple steps are necessary to attach and detach my marker to and from the sprayer. The first step in the attachment of my marker is the placement and securing of the pressure tank 14 in the bracket 15. Next the conduits 20 are attached to the booms 11 and 12 with the brackets 22 and the straps 23. Finally the valve 18 and the tubing 19 are secured to the sprayer 10 and booms 11 and 12 in any suitable manner to complete the attachment. Removal of my marker is quickly accomplished by the reversal of the above procedures. Normally the bracket 15 or other mounting means will be left in place on the sprayer when my marker is detached to facilitate rapid re-attachment. However, the bracket 15 may also be detached from the sprayer 10 with a minimum of effort, is desired. It is also apparent that it may sometimes be necessary to use my marker on only one boom of the sprayer 10, in which case it is not necessary to mount the conduit 20 and tubing 19 on the opposite boom.

A first embodiment of my inventive method of marking chemically treated surfaces involves the use of my new, dye dispensing marker device, as previously described. A second embodiment of my inventive method requires no extra spraying equipment. In the second embodiment of my invention, the chemical material itself is dyed or colored before it is applied. The chemical material then clearly marks the extent of the treated surface as it is directly applied to that surface. Any easily noticeable dye or coloring agent which is compatible with the particular material being used and which is not harmful to the foliage to be treated may be mixed with the chemical material to color it.

Whether a person uses my dye dispersing marker or uses colored chemical materials is a matter of economic choice. For most operations, less dye or coloring agent will be used with my marker device than must be used to color the chemical material itself, for the obvious reason that the coloring agent is applied to only a small portion of the treated surface by my device. On the other hand, the treated surface can be marked by mixing the coloring agent directly with the chemical material without requiring the use of my marking device. Generally, the marker device is usually more economical for large scale operations, while the colored chemical material usually is more economical for small scale operations.

The primary advantage of my invention is economy of operation and use. Double treating is substantially eliminated, thus reducing the amount of spray material an operator might usually use to assure complete coverage. Such saving of costly spray materials alone is usually more than sufficient to pay for the cost of the sprayer in a single season. Each year after the first year then means increased profits for the user of my marker. Similarly, the expense of the dye or coloring agents which are used in accordance with my method is usually more than compensated for by the saving of spray material.

Perhaps even more important than the above described economic advantages are the possible long range benefits to plant and animal life which may result from the use of my marker device and my method. Conservationists are increasingly worried about the detrimental effects of weed killer and insecticide residues, and their misuse. Such residues in the soil may hinder the full and healthy production of food, feed and fiber. Since the use of my method and device substantially prevents double treating or application, it will tend to slow the accumulation of these harmful residues.

My marker and my method are not limited to use with sprayers. They may be used with fertilizers, spreaders, planters or indeed any apparatus which must distribute material uniformly on or beneath a surface.

It is understood that my invention is not confined to the particular arrangement of parts herein illustrated and described, but embraces all such modified forms thereof as come within the scope of the following claims.

I claim:

1. In combination, a marker and a sprayer with a boom, said marker comprising a pressure tank adapted to contain a dye, said pressure tank being mounted on said sprayer, a valve in communication with said tank for controlling the flow of dye therefrom, conduit means extending from said valve, means including a bracket and a strap for removably attaching said conduit means to said boom, said bracket comprising first and second substantially U-shaped channels joined together back to back, said first channel engaging said conduit means and said second channel engaging said boom, said strap extending around said engaged bracket, conduit means and boom in tight relation, and a nozzle for discharging dye projecting from said conduit means at a point slightly beyond the end of said boom.

2. In a combination marker and sprayer with a boom, said marker having a pressure tank mounted on said sprayer and adapted to contain a dye, a valve in communication with said tank for controlling the flow of dye therefrom, conduit means extending from said valve, and a nozzle for discharging dye projecting from said conduit means at a point slightly beyond the end of said boom, means for removably attaching said conduit means to said boom which comprises, a bracket including first and second substantially U-shaped channels joined together back to back, said first channel engaging said conduit means and said second channel engaging said boom, and a strap extending around said engaged bracket, conduit means and boom in substantially tight relation.

References Cited by the Examiner

UNITED STATES PATENTS

| | | | |
|---|---|---|---|
| 1,943,152 | 12/34 | Weiss | 239—1 |
| 2,199,421 | 5/40 | Stevens | 239—172 X |
| 2,267,975 | 12/41 | Heck | 239—302 |
| 2,392,408 | 1/46 | Radonich | 239—1 |
| 2,469,542 | 5/49 | Becker. | |
| 2,995,308 | 8/61 | Ashkenaz | 239—302 |
| 3,019,470 | 2/62 | Romeo. | |

FOREIGN PATENTS

| | | |
|---|---|---|
| 477,619 | 10/51 | Canada. |

References Cited by the Applicant

UNITED STATES PATENTS

| | | |
|---|---|---|
| 1,186,795 | 6/16 | Johnson. |
| 2,336,577 | 12/43 | Singleton. |
| 2,520,680 | 8/50 | Hamilton. |
| 2,976,647 | 3/61 | Pickrell. |

M. HENSON WOOD, JR., *Primary Examiner.*

EVERETT W. KIRBY, *Examiner.*